(No Model.)
M. MAUCH.
DUMPING WAGON.
No. 494,377. Patented Mar. 28, 1893.
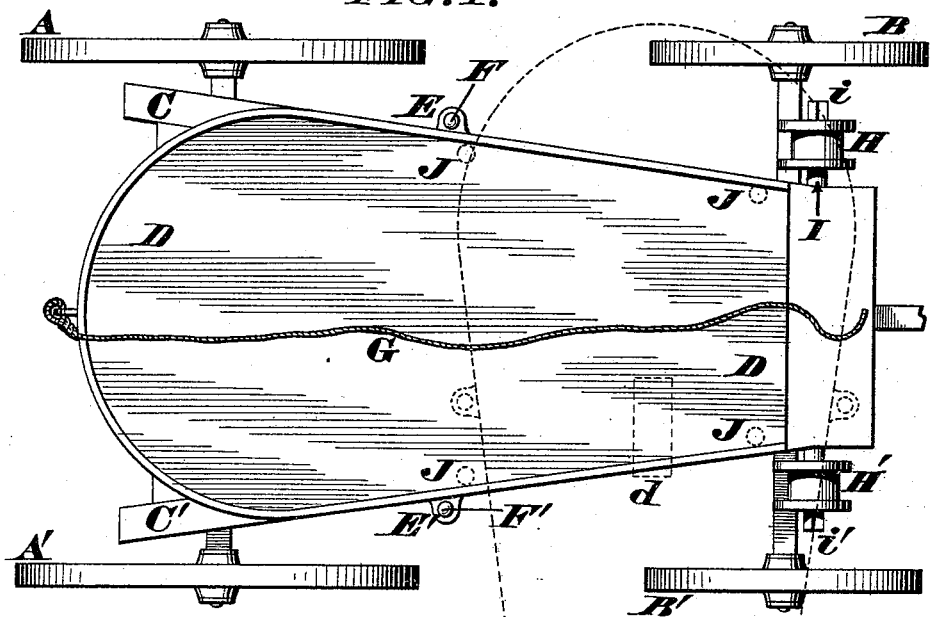
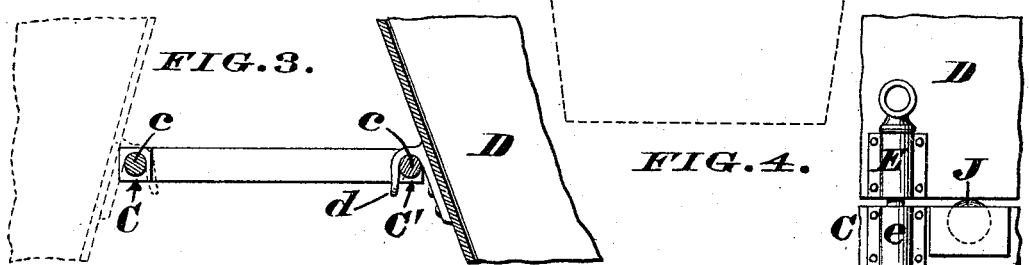
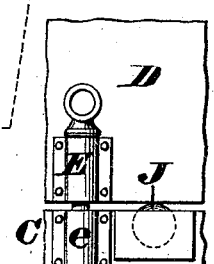
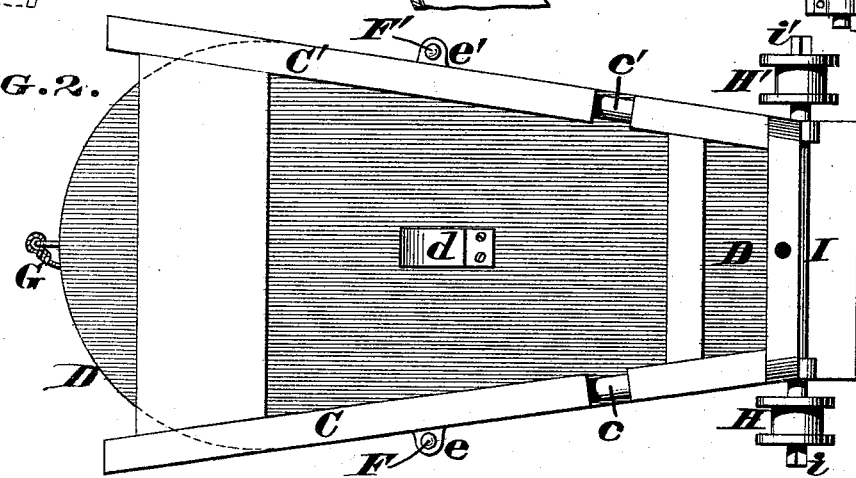
Attest.
Arthur Schmidt
Harry Byrne
Inventor.
Conrad Mauch,
by James H. Layman.
Atty.
THE NORRIS PETERS CO., PHOTO-LITHO., WASHINGTON, D. C.

UNITED STATES PATENT OFFICE.

MEINRAD MAUCH, OF CINCINNATI, OHIO.

DUMPING-WAGON.

SPECIFICATION forming part of Letters Patent No. 494,377, dated March 28, 1893.

Application filed November 29, 1892. Serial No. 453,473. (No model.)

*To all whom it may concern:*

Be it known that I, MEINRAD MAUCH, a citizen of the German Empire, residing at Cincinnati, in the county of Hamilton and State of Ohio, have invented certain new and useful Improvements in Dumping-Wagons; and I do hereby declare the following to be a full, clear, and exact description of the invention, reference being had to the annexed drawings, which form part of this specification.

My invention comprises a peculiar construction of dumping-wagon, the bed of which is capable of being swung around bodily, either to the right or left, until it reaches a position directly across the main frame of the vehicle, and then said bed is inclined, so as to discharge the load at one side, as hereinafter more fully described.

In the annexed drawings, Figure 1 is a plan of my improved dumping-wagon, the bed of the same being in its normal position and its dumping position indicated by dotted lines. Fig. 2 is a plan of the under side of the main frame of the vehicle, the bed thereof being in the same position as in the preceding illustration. Figs. 3 and 4 are detail views of certain parts of the wagon.

A, A′, represent a pair of rear wheels, and B, B′, a pair of front wheels that support a main frame, the principal members of which are two side-beams C, C′, which converge toward the wheels B, B′, as more clearly seen in Fig. 2. These side beams are united together by suitable cross-beams and are rounded at $c, c'$, for the ready engagement of a hook $d$, when a load is to be dumped, said hook being secured to the under side of a bed or body D. This body is, preferably, of sheet metal, and its rear end is usually rounded, to clear the wheels A, A′, when turned either to the right or left. Projecting laterally from the body are sockets E, E′, in line with similar sockets $e, e'$, attached to the side beams C, C′, pins F, F′, being engaged with these devices, as seen in Fig. 4.

G is a rope or chain, one end of which is secured about at the center of the rounded part of the body, while the other end of said rope is free to be coiled upon either of the drums H, H′, of a shaft I. This shaft is journaled across the front end of the main frame and has a pair of squares $i, i'$, to either of which a crank or hand-wheel may be applied.

The dotted circles, J, represent ball bearings for the front portion of body D to rest upon.

Assuming that the body has been filled, and that it is desired to dump the load on the side of the wagon, indicated by dotted lines in Fig. 1, the following operations are necessary. Pin F is first pulled out of socket $e$, and rope G is carried around the rear end of the body, and then brought forward and wound upon the drum H. This act causes the body to swing around, the other pin F′, serving as its center of motion, which swinging is readily effected because the front portion of said body rests upon the ball bearings J. After the body has been swung around a sufficient distance, the hook or catch $d$, engages with the round $c'$ of beam C′, and then this pivot pin F′, is pulled out of its socket $e'$. The body now stands squarely across the main frame, and being almost balanced, a very slight exertion will incline it to the angle seen in Fig. 3, the hook $d$ being still engaged with the round $c'$. After thus dumping the load, the body is swung down to a horizontal position, so as to rest upon the balls J, the pin F′, re-inserted, the body turned back to its original position, and then the other pin F is applied to its socket. The body is now securely locked in place upon the main frame and can be easily loaded and unloaded, as above described. If a load is to be dumped on the other side of the wagon, the above-described operations must be reversed—that is to say, the pin F′ must first be withdrawn and the rope wound around the drum H′, to incline the body as indicated by dotted lines in Fig. 3. From this description it is evident that a load can be dumped either to the right or left, thus rendering my wagon especially adapted for delivering coal in alleys and other narrow passages where it is impossible to turn an ordinary vehicle. The drawings show the body arranged to dump at its front end, which may be provided with a suitable gate, but the invention is not limited in this respect, as the delivery may take place at the rear end of said body—provided the wheels A, A′, are not too large in diameter. But a delivery at the front end is preferred, because the wheels B, B', are comparatively small in diameter and can be swung in any direction that will afford ample clearance for the inclined body. Finally, when the wagon is arranged for hauling light loads, the shaft I and drums H, H', may be dispensed with.

I claim as my invention—

1. The combination, in a dumping wagon, of a running-gear, a frame mounted thereon, and a body pivoted at its sides to said frame by a pair of shiftable pins, whereby said body is capable of being swung around either to the right or left, substantially as herein described.

2. The combination, in a dumping wagon, of a running gear, a frame mounted thereon, a body pivoted at its sides to said frame by a pair of shiftable pins, and a catch on the under side of said body, which catch is so arranged as to engage with side beams of said frame, for the purpose described.

3. The combination, in a dumping-wagon, of a running gear, a frame mounted thereon, a body pivoted at its sides to said frame by a pair of shiftable pins, and devices for swinging said body around, either to the right or left of said frame, for the purpose described.

4. The combination, in a dumping-wagon, of a running gear, a frame C, C', mounted thereon and having rounded bearings $c. c'$. a body D pivoted at its sides to said frame by a pair of shiftable pins F, F', and having a catch $d$ on its under side, a shaft I journaled to said frame and having a pair of drums H. H'. and a rope or chain G having one end secured to said body and its other end free to be wound around either of said drums, for the purpose described.

In testimony whereof I affix my signature in presence of two witnesses.

MEINRAD MAUCH.

Witnesses:
JAMES H. LAYMAN,
ARTHUR MOORE.